(12) United States Patent
Smith

(10) Patent No.: US 9,626,544 B2
(45) Date of Patent: *Apr. 18, 2017

(54) REMOVABLE MODULE FOR MOBILE COMMUNICATION TERMINAL

(71) Applicant: Hand Held Products, Inc., Fort Mill, SC (US)

(72) Inventor: Taylor Smith, Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/068,674

(22) Filed: Mar. 14, 2016

(65) Prior Publication Data

US 2016/0196460 A1 Jul. 7, 2016

Related U.S. Application Data

(63) Continuation of application No. 13/748,632, filed on Jan. 24, 2013, now Pat. No. 9,286,496.

(Continued)

(51) Int. Cl.
 *G06K 7/10* (2006.01)
 *G06K 7/14* (2006.01)
 (Continued)

(52) U.S. Cl.
 CPC ......... *G06K 7/1413* (2013.01); *G06K 7/0004* (2013.01); *G06K 7/10009* (2013.01);
 (Continued)

(58) Field of Classification Search
 CPC ............. G06K 7/1413; G06K 7/10722; G06K 7/10009; G06K 7/10544; G06K 7/0004
 (Continued)

(56) References Cited

U.S. PATENT DOCUMENTS 5,664,231 A * 9/1997 Postman ............... G06F 1/1626
 235/462.41
5,671,374 A * 9/1997 Postman ............... G06F 1/1626
 235/472.01

(Continued)

*Primary Examiner* — Paultep Savusdiphol
(74) *Attorney, Agent, or Firm* — Additon, Higgins & Pendlenton, P.A.

(57) ABSTRACT

A decodable indicia reading system can comprise a mobile communication terminal and a removable module. The mobile communication terminal can comprise a microprocessor, a memory, and an imaging device comprising a two-dimensional image sensor, all disposed within a housing. The removable module can comprise a housing at least partially containing an encoded information reading (EIR) device, an illumination module, and/or an optical system configured to focus the light reflected by a physical object located within a field of view of the two-dimensional image sensor onto the two-dimensional image sensor. The decodable indicia reading system can further comprise a decoding program executable by the microprocessor, which can be configured to input an encoded information item the imaging device and/or the EIR device. The removable module can be mechanically attached to the mobile communication terminal. The removable module can further comprise a memory configured to store a secret string. The decoding program can be further configured to output a decoded message by decoding the encoded information item responsive to validating the secret string and/or decrypting, using the secret string, at least one data item stored in the memory.

20 Claims, 6 Drawing Sheets

Related U.S. Application Data

(60) Provisional application No. 61/710,933, filed on Oct. 8, 2012.

(51) Int. Cl.
 G06K 7/00 (2006.01)
 H04L 29/08 (2006.01)
 H04M 1/725 (2006.01)

(52) U.S. Cl.
 CPC ..... G06K 7/10544 (2013.01); G06K 7/10722 (2013.01); H04L 67/306 (2013.01); H04M 1/72575 (2013.01)

(58) Field of Classification Search
 USPC .............. 235/435, 440, 454, 462.43, 462.47, 235/462.13
 See application file for complete search history.

(56) References Cited

U.S. PATENT DOCUMENTS

| | | | |
|---|---|---|---|
| 6,041,374 A * | 3/2000 | Postman | G06F 1/1626 710/2 |
| 6,536,670 B1 * | 3/2003 | Postman | G06F 1/1626 235/487 |
| 7,225,440 B2 | 5/2007 | Himmel et al. | |
| 7,225,448 B2 | 5/2007 | Himmel et al. | |
| 7,440,774 B2 | 10/2008 | Croome | |
| 7,822,973 B2 * | 10/2010 | Okaya | H04L 9/0844 713/1 |
| 7,831,279 B2 | 11/2010 | Croome | |
| 8,023,998 B2 | 9/2011 | Croome | |
| 8,494,585 B2 * | 7/2013 | Chapman | H04M 1/0254 455/550.1 |
| 8,707,049 B2 * | 4/2014 | Lu | H04L 9/3226 380/44 |
| 8,812,860 B1 * | 8/2014 | Bray | G06F 21/34 713/182 |
| 9,286,496 B2 | 3/2016 | Smith | |
| 2003/0228866 A1 | 12/2003 | Pezeshki | |
| 2004/0041029 A1 * | 3/2004 | Postman | G06F 1/1626 235/462.3 |
| 2005/0033848 A1 | 2/2005 | Croome | |
| 2005/0038960 A1 | 2/2005 | Himmel et al. | |
| 2006/0105722 A1 * | 5/2006 | Kumar | G06F 1/1632 455/90.3 |
| 2008/0026730 A1 | 1/2008 | Appaji | |
| 2008/0162925 A1 * | 7/2008 | Okaya | H04L 9/0844 713/155 |
| 2008/0220775 A1 | 9/2008 | Tischer et al. | |
| 2008/0273682 A1 | 11/2008 | Bakker et al. | |
| 2008/0275995 A1 | 11/2008 | Soliman et al. | |
| 2009/0055892 A1 * | 2/2009 | Lu | H04L 9/3226 726/2 |
| 2009/0082029 A1 | 3/2009 | Holcman et al. | |
| 2009/0264153 A1 | 10/2009 | Croome | |
| 2010/0093396 A1 | 4/2010 | Roundtree | |
| 2012/0207341 A1 | 8/2012 | Croome | |
| 2012/0233402 A1 | 9/2012 | Laaksonen et al. | |
| 2012/0270524 A1 | 10/2012 | Venkataramu | |
| 2013/0095888 A1 * | 4/2013 | Chapman | H04M 1/0254 455/557 |
| 2013/0232571 A1 * | 9/2013 | Belesiu | G06F 1/26 726/21 |

* cited by examiner

REMOVABLE MODULE FOR MOBILE COMMUNICATION TERMINAL

CROSS-REFERENCE TO RELATED APPLICATIONS

The present application claims the benefit of U.S. patent application Ser. No. 13/748,632 for a Removable Module for Mobile Communication Terminal filed Jan. 24, 2013 (and published Apr. 10, 2014 as U.S. Patent Publication No. 2014/0097248), now U.S. Pat. No. 9,286,496, which claims the benefit of U.S. Patent Application No. 61/710,933 for a Removable Module for Mobile Communication Terminal filed Oct. 8, 2012. Each of the foregoing patent applications, patent publication, and patent is hereby incorporated by reference in its entirety.

FIELD OF THE INVENTION

The present invention relates generally to mobile communication terminals, and in particular to mobile communication terminals configured to read decodable indicia.

BACKGROUND

Decodable indicia are patterns, marks, or messages which are designed to be scanned and interpreted by computer and/or other mechanical and/or automated methods. Many known types of decodable indicia fall under the category of barcodes. Barcodes are graphical representations of data, the most common of which are referred to as one dimensional (1D) and two dimensional (2D) barcodes. 1D barcodes are graphical entities that represent data by varying the widths and spacing of parallel lines. 2D barcodes are also graphical entities that represent data, but in addition to the parallel lines, or bars, a 2D barcode may contain rectangles, dots, hexagons and other geometric patterns in two dimensions. The data encoded in the barcodes are interpreted by optical scanners and/or software. Barcodes can be scanned by special optical scanners called barcode readers as well as by general purpose devices such as smart phones. Other types of decodable indicia include optical character recognition (OCR), glyphs, or other visual markings. Also, non-visual technologies such as magnetic strips, radio-frequency identification (RFID), and other non-visual technologies fall under the definition of decodable indicia as well.

SUMMARY

There is provided a system comprising a mobile communication terminal and a removable module. The mobile communication terminal can be configured to execute one or more application programs. The removable module can be mechanically attached to the mobile communication terminal. The removable module can provide expanded general purpose and/or application-specific functionality, prevent unauthorized use of the application software executable by the mobile communication terminal, and/or store user profile settings for one or more applications executable by the mobile communication terminal. In some embodiments, the removable module can further comprise a memory configured to store a secret string. At least one application program executable by the mobile communication terminal can be configured to perform its intended functionality only responsive to validating a secret string and/or decrypting, using the secret string, at least one data item stored in the memory.

In one illustrative embodiment, there is provided a decodable indicia reading system comprising a mobile communication terminal and a removable module. The mobile communication terminal can comprise a microprocessor, a memory, and an imaging device comprising a two-dimensional image sensor, all disposed within a housing. The removable module can comprise a housing at least partially containing an encoded information reading (EIR) device, an illumination module, and/or an optical system configured to focus the light reflected by a physical object located within a field of view of the two-dimensional image sensor onto the two-dimensional image sensor. The decodable indicia reading system can further comprise a decoding program executable by the microprocessor, which can be configured to input an encoded information item the imaging device and/or the EIR device. The removable module can be mechanically attached to the mobile communication terminal. The removable module can further comprise a memory configured to store a secret string. The decoding program can be further configured to output a decoded message by decoding the encoded information item only responsive to validating the secret string and/or decrypting, using the secret string, at least one data item stored in the memory.

In some embodiments, the mobile communication terminal can further comprise at least one wired communication interface including an electromechanical connector mechanically attached to the housing. The removable module can be communicatively coupled to the mobile communication terminal via the electromechanical connector. In a further aspect, the electromechanical connector can be provided by a USB connector, a PCMCIA connector, or an Ethernet connector.

In some embodiments, the EIR device can be provided by an RFID reading device, a card reading device, and/or a laser scanning device.

In some embodiments, the validating the secret string can be performed by an external computer.

In some embodiments, the secret string can be dynamically generated by the removable module.

In some embodiments, the mobile communication terminal further comprises a wireless communication interface communicatively coupled to the microprocessor.

In some embodiments, the mobile communication terminal can be provided by a smart phone, a tablet personal computer (PC), or a personal digital assistant (PDA).

In some embodiments, the imaging device further can comprise an amplifier configured to amplify an analog signal outputted by the two-dimensional image sensor, an analog-to-digital (A/D) converter configured to convert the analog signal into a digital signal, and/or a control circuit configured to control the imaging device.

In some embodiments, the laser scanning device can comprise a laser source, a photo-detector configured to generate an analog signal representative of a received light beam of variable intensity, and an analog-to-digital (A/D) converter configured to convert the analog signal into a digital signal.

In some embodiments, the illumination module can comprise an illumination pattern light source bank including one or more light sources, an aiming pattern light source bank including one or more light sources, and/or an illumination assembly control module.

In some embodiments, the optical system can comprise at least one mirror configured to deflect the light reflected by the physical object located within a field of view of the two-dimensional image sensor.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION

Figure 1A:
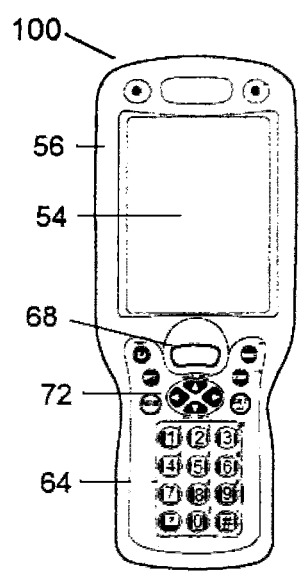
FIGS. 1a-1b schematically illustrate one embodiment of a mobile communication terminal described herein.
Figure 1B:
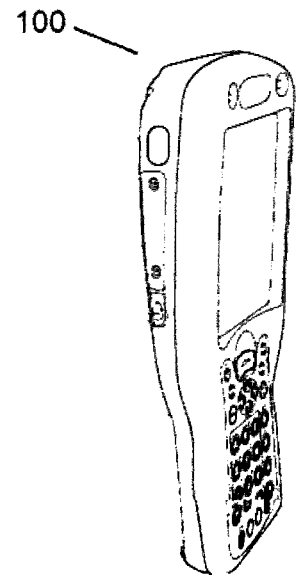

General purpose mobile communication terminals, such as smart phones, tablet personal computers (PCs), personal digital assistants (PDA), and other similar devices usually possess the computing power sufficient for executing point-of-sale (POS) or enterprise business applications, such as, for example, reading and/or decoding decodable indicia. Application software executable by a mobile communication terminal can be developed by a third-party vendor who might want to prevent unauthorized use of the software. In order to provide expanded application functionality, such as, for example, expanded scanning functionality, the third-party vendor can also supply a removable module that can be mechanically attached to the mobile communication terminal. For example, such a removable module can include an optical system configured to deflect the light reflected off the object being scanned, in order to provide a more ergonomic scanning orientation of the mobile communication terminal equipped with the removable module. In another example, a removable module can include an illumination source emitting illumination and/or aiming light. In a yet another example, a removable module can include an encoded information reading device, for example, a laser-based scanner, a card reader, and/or an RFID reading device.

In some embodiments, the removable module can provide general purpose functionality, such as, for example, an additional storage memory, an additional battery, etc. In some embodiments, the removable module can provide application-specific functionality, for scanning, decoding, and/or other types of applications, including, for example, POS, or enterprise applications.

In addition to providing expanded application-specific and/or general purpose functionality, the removable module can be employed to store a software security token (e.g., a secret string). An application (such as, for example, a decoding application) executable by the mobile communication terminal can be designed to retrieve and validate the secret string before performing its intended business functionality (for example, before attempting a decoding operation).

In addition to preventing unauthorized use of one or more applications executable by the mobile communication terminal, the removable module described herein can be configured to store user profile settings for one or more applications executable by the mobile communication terminal. The user profile settings can include one or more system-wide and/or application-specific parameters. In some embodiments, the user profile settings can include one or more authorization settings authorizing the user to perform one or more system-wide or application-specific functions. In a further aspect, the authorization settings can be represented by a list of user groups to which a particular user belongs.

Thus, the removable module described herein can provide expanded general purpose and/or application-specific functionality (such as, for example, enhanced scanning functionality described herein supra), prevent unauthorized use of the application software (such as, for example, decoding software) executable by the mobile communication terminal, and/or store user profile settings for one or more applications executable by the mobile communication terminal.

In one illustrative embodiment, there is provided a decodable indicia reading system comprising a general purpose mobile communication terminal (for example, a smart phone, a PDA, or a tablet PC) and a removable module. In some embodiments, the removable module can comprise at least one encoded information reading (EIR) device (for example, a laser scanning device, a card reading device, or an RFID reading device). The EIR device can be configured to output raw message data containing an encoded message and/or output decoded message data corresponding to the encoded message.

In some embodiments, the removable module can comprise an illumination module configured to emit illumination and/or aiming light patterns. In some embodiments, the removable module can comprise an optical system which can be configured, for example, to deflect the light reflected off the object being scanned, in order to provide a more ergonomic scanning orientation of the mobile communication terminal equipped with the removable module.

One illustrative embodiment of a mobile communication terminal is shown in FIGS. 1a (front panel view) and 1b (side panel view). The mobile communication terminal 100 can comprise a housing 52 within which other components of mobile communication terminal 100 can be disposed. A display 54 can be disposed on the front panel 56. Also disposed on the front panel 56 can be a keyboard 64 including functional keys 68, navigation keys 72, and/or numeric keys. At least one connector of a wired communication interface can be disposed on the bottom panel or side panel of the housing 52 (e.g., a USB, PCMCIA, Ethernet, or MiniUSB connector).

Figure 2A:
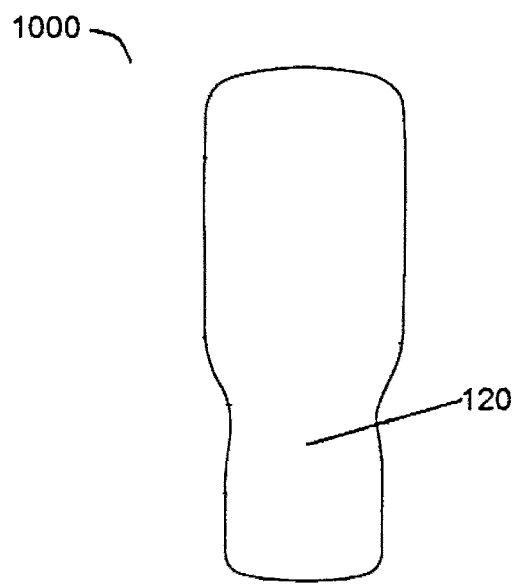
FIGS. 2a-2b schematically illustrate one embodiment of the decodable indicia reading system disclosed herein.
Figure 2B:
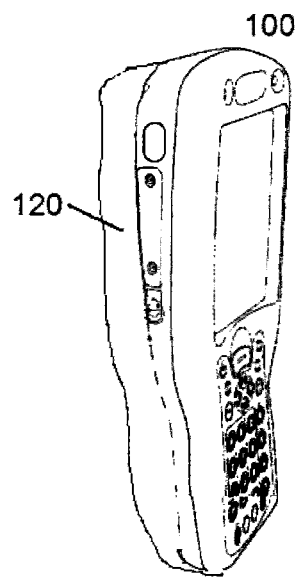

In a further aspect, a removable module can be connected to a mobile communication terminal via the wired communication interface. As schematically shown in FIGS. 2a (rear panel view) and 2b (side panel view), removable module 120 can have a sled form factor designed to be mechanically connected to the mobile communication terminal 100. A skilled artisan would appreciate the fact that other form factors of the removable module are within the scope of this disclosure.

Figure 3:
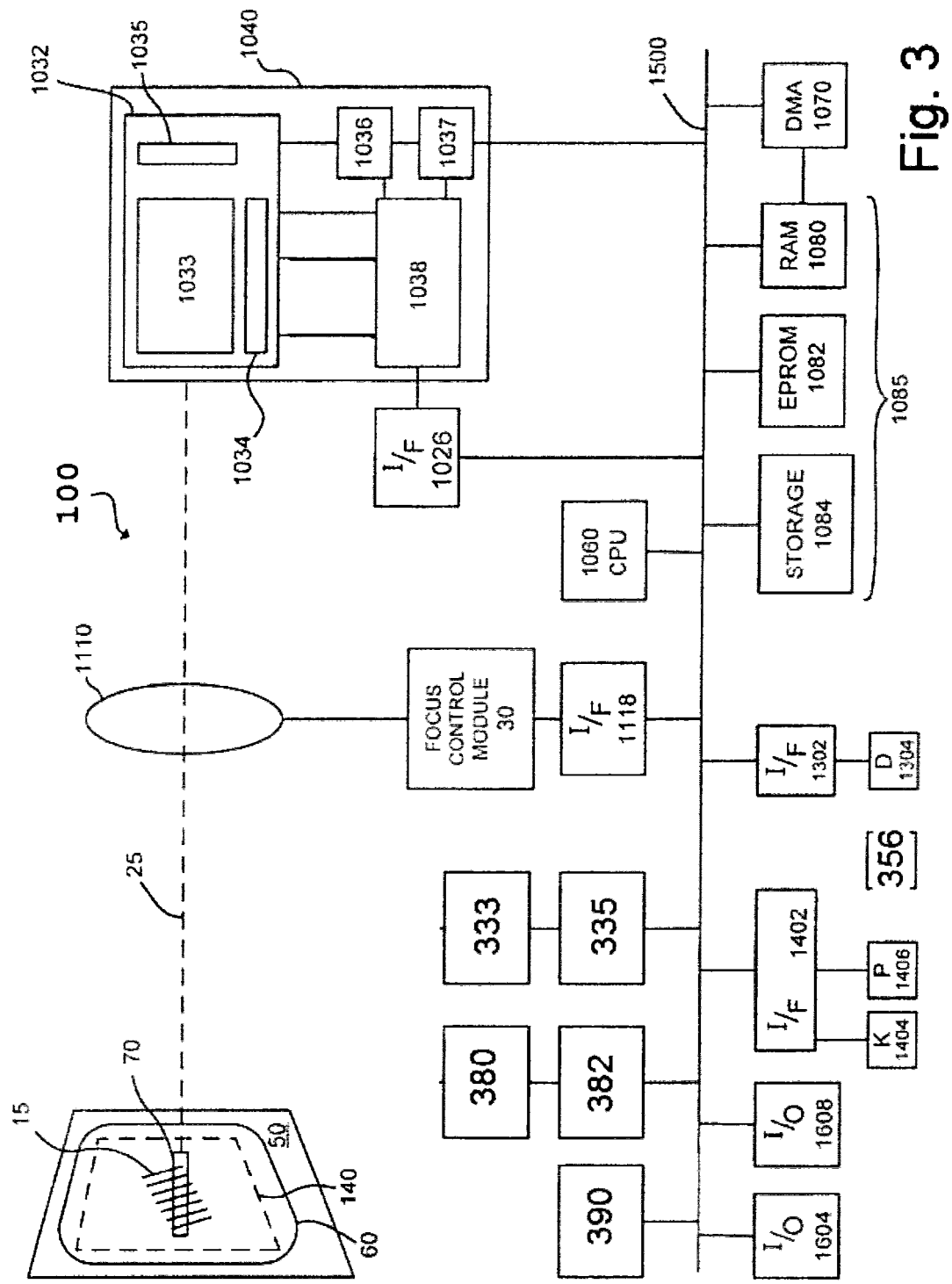
FIG. 3 depicts a component-level diagram of an illustrative embodiment of the mobile communication terminal described herein.

Component-level diagram of an illustrative embodiment of the mobile communication terminal is now being described with references to FIG. 3. Mobile communication terminal 100 can include microprocessor 1060 communicatively coupled to system bus 1500. Also coupled to system bus 1500 can be various interface circuits for coupling the peripheral devices, including, e.g., interface circuit 1302 for coupling display 1304, and interface circuit 1402 for coupling keyboard 1404 and pointing device 1406 to system bus 1500.

In a further aspect, the mobile communication terminal 100 can include one or more communication interfaces 1604, 1608 for providing communications with external devices. Communication interfaces 1604, 1608 can include one or more wired interfaces (e.g., Ethernet (IEEE 802.3), USB, RS/485, etc.) and one or more wireless interfaces (e.g., interfaces configured to support at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family).

Also coupled to system bus 1500 can be memory 1085 provided by random access memory (RAM) 1080. In some embodiments, memory 1085 can further comprise a non-volatile memory such as EPROM 1082, and/or a storage memory device 1084 such as a flash memory or a hard drive.

In some embodiments, mobile communication terminal 100 can further include a direct memory access unit (DMA) 1070 providing direct communications of one or more devices communicatively coupled to system bus 1500 with RAM 1080. Alternatively, mobile communication terminal 100 can employ a system bus providing for bus arbitration mechanism (e.g., a PCI bus) thus eliminating the need for a central DMA controller. Other embodiments of the system bus architecture and/or direct memory access components providing for efficient data transfer between one or more devices communicatively coupled to system bus 1500 and RAM 1080 can be provided.

In some embodiments, mobile communication terminal 100 can include a build-in imaging device 1040 configured to acquire two-dimensional monochrome and/or color images. Imaging device 1040 can comprise an image sensor 1032 including a multiple pixel image sensor 1033 array having pixels arranged in rows and columns, associated column circuitry 1034, and row circuitry 1035. In one embodiment, the image sensor 1033 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention. Associated with the image sensor 1032 can be amplifier circuitry 1036, and an A/D converter 1037 which converts image information in the form of analog signals read out of image sensor 1033 into image information in the form of digital signals. In one embodiment, the A/D converter 1037 can be provided by an A/D array.

Image sensor 1032 can also have an associated timing and control circuit 1038 for use in controlling e.g., the exposure period of image sensor 1032, gain applied to the amplifier circuitry 1036. As noted herein supra, the circuit components 1032, 1036, 1037, and 1038 can be packaged into a common imaging device 1040.

Mobile communication terminal 100 can include interface circuit 1026 for coupling image sensor timing and control circuit 1038 to system bus 1500. Mobile communication terminal 100 can be configured to read out analog signals representative of light incident on one or more pixels. The read out analog signals can be amplified by the analog signal amplifier 1036. The analog signals can then be fed to the input of the ADC 1037. The resulting digital values representative of the analog signals can be stored in a system memory such as RAM 1080. Image frame data stored in RAM 1080 can be in the form of multibit pixel values, with each multibit pixel value representing light incident on a pixel of image sensor 1033. DMA unit 1070 can route image information read out from image sensor 1032 to RAM 1080. In another aspect, microprocessor 1060 can be programmed to read out image data stored in memory 1080 and subject such image data to various image processing algorithms.

In some embodiments, the mobile communication terminal 100 can include a variable focus imaging lens 1110 for use in focusing an image of a decodable indicia located within a field of view 140 on a substrate 50 onto image sensor 1033. Imaging light rays can be transmitted about imaging axis 25. Variable focus imaging lens 1110 can be adapted to be capable of multiple best focus distances and multiple focal lengths. Variable focus imaging lens 1110 can be operative to provide a new best focus distance and/or focal length within a fraction of a frame time in response to an applied input control signal being applied to the variable focus imaging lens 1110. In one embodiment, the variable focus imaging lens 1110 can be provided by a deformable imaging lens, e.g., a deformable fluid lens or gel lens. In another embodiment, the variable focus imaging lens 1110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

Mobile communication terminal 100 can further comprise a battery 356. Mobile communication terminal 100 can further comprise a GPS receiver 380 communicatively coupled to system bus 1500 via interface 382. The mobile communication terminal 100 can further comprise at least one connector 390 configured to receive a subscriber identity module (SIM) card, also communicatively coupled to system bus 1500. A skilled artisan would appreciate the fact that mobile communication terminal 100 can comprise various other components, circuits, and interfaces.

In some embodiments, the mobile communication terminal 100 can further comprise an embedded EIR device 333 communicatively coupled to system bus 1500 via interface 335. EIR device 333 can be provided, for example, by a laser scanning device, an RFID reading device, an NFC reading device, or a magnetic card reading device. The EIR device can be configured to output raw message data containing an encoded message and/or output decoded message data corresponding to the encoded message. As used herein, "message" is intended to denote a byte sequence or a character string comprising alphanumeric and/or non-alphanumeric characters. An encoded message can be used to convey information, such as identification of the source and the model of an item, for example, in an EPC code.

Figure 4A:
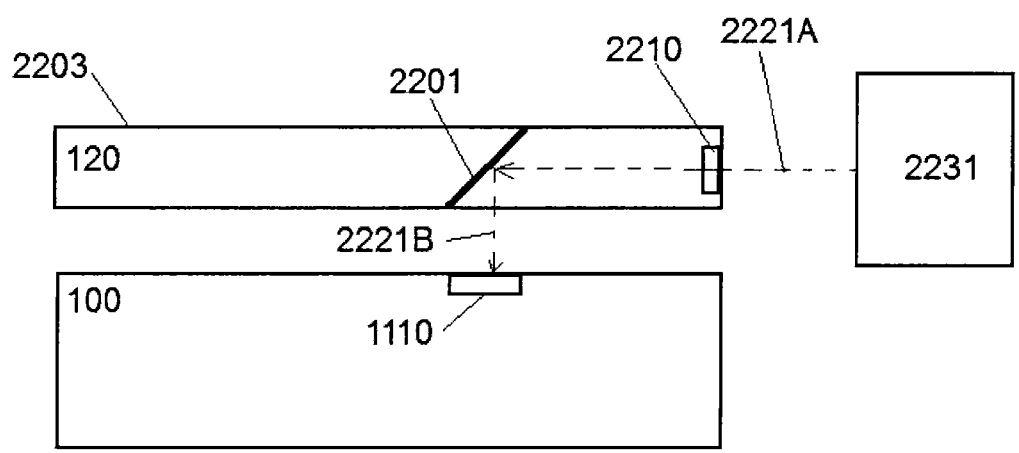
FIGS. 4a-4c illustrate component-level diagrams of various illustrative embodiments of the removable module disclosed herein.

Component-level diagram of one illustrative embodiment of the removable module is now being described with references to FIG. 4a. Removable module 120 can comprise a mirror 2201 disposed within a housing 2203 and deflecting the light beams 2221A reflected off the scanned objet 2231. Mirror 2201 can be oriented to direct the deflected light beams 2221B towards the imaging lens 1110 of the mobile communication terminal 100. The position of mirror 2201 can be configured to provide a more ergonomic scanning orientation of the mobile communication terminal 100 equipped with the removable module 120. In some embodiments, removable module 120 can further comprise an imaging lens 2210 configured to focus the light beams 2221A reflected off the scanned objet 2231 onto the mirror 2201.

Figure 4B:
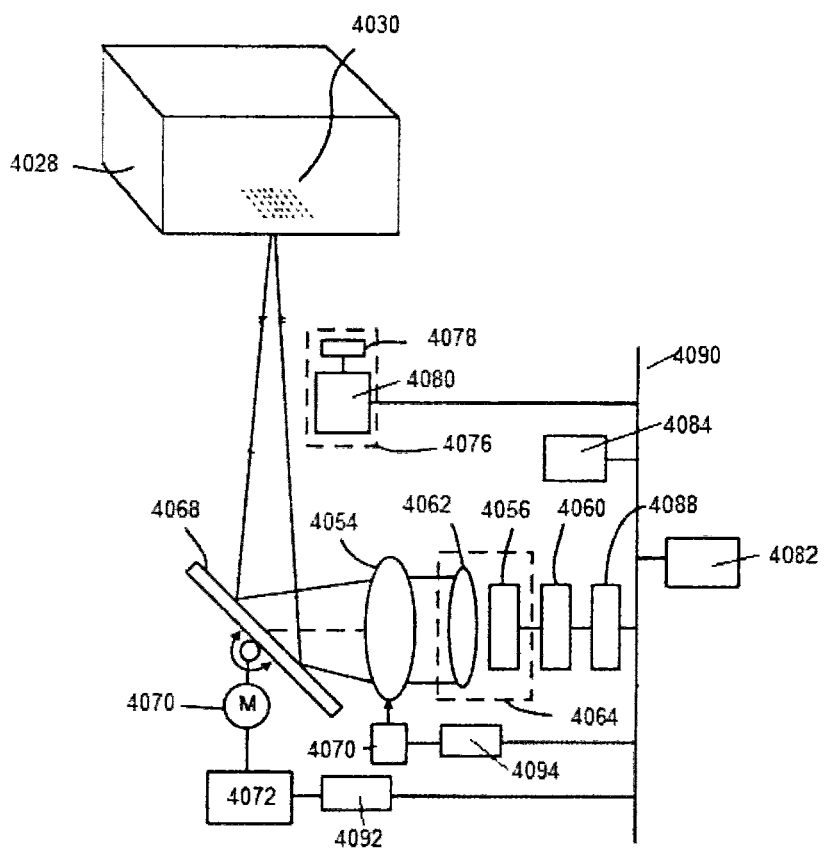

In another illustrative embodiment, schematically described in FIG. 4b, removable module 120 can comprise a laser scanner which uses a focused laser beam to sequentially scan the bars and spaces of a bar code symbol pattern to be read. As the laser beam is scanned across the bar code symbol, a portion of the reflected light beam is collected by optics within the scanner. The collected light signal can subsequently be focused upon a photo-detector within the scanner. The photo-detector can, in one example, generate an analog electrical signal which can be converted into a digital signal representative of the bar code symbol.

As schematically shown in FIG. 4b, removable module 120 can comprise a lens assembly 4054, which can include a fixed lens, a variable position lens holder adapted for use with a moveable lens system, or a variable focus fluid lens, for example. Removable module 120 can further comprise a laser source 4056 which can emit a laser beam. Laser source 4056 can be coupled to a laser source control circuit 4060. Light from laser source 4056 can be shape by collimating optics 4062 and lens assembly 4054. The combination of laser source 4056 and collimating optics 4062 can be regarded as a laser diode assembly 4064. The laser beam emitted by laser source 4056 can illuminate substrate 4028 bearing decodable indicia 4030. Scanning mirror reflector 4068 disposed within the optical path of the laser beam emitter by laser source 4056 can oscillate to direct the laser beam across the entire surface to be scanned. Reflector 4068 can be driven by scan motor 4070 which can be coupled to control circuit 4072.

The laser beam emitted by laser source 4056 can reflect off substrate 4028 and then travel back to photo-detector assembly 4076. The incident laser light can be reflected by areas of dark and white bands of the bar code 4030 borne by substrate 4028. The reflected beam can thus have variable intensity representative of the bar code pattern. Photo-detector assembly 4076 including photo-detector 4078 and A/D converter 4080 can receive the reflected beam of variable intensity, generate an analog signal corresponding to the reflected beam, and convert it to a digital signal representative of the beam intensity. The resulting digital values representative of the analog signal can be combined to form 1D image data. The image data can be transmitted to mobile communication terminal 100 via a wired I/O interface (not shown in FIG. 4b) provided, e.g., by Ethernet (IEEE 802.3), USB, RS/485, etc. In some embodiments, the image frame data can be buffered in RAM (not shown in FIG. 4b) before being transmitted to mobile communication terminal 100.

In some embodiments, removable module 120 can include microprocessor 4084 communicatively coupled to system bus 4090. Microprocessor 4084 can be provided by a general purpose microprocessor or by a specialized microprocessor. Microprocessor 4084 can be programmed to decode bar code symbols, by processing a digital signal corresponding to the reflected laser beam to determine a spatial pattern of dark cells and light cells, followed by converting each light and dark cell pattern determined into a character of character string via table lookup. The resulting decoded message data corresponding to the decodable indicia can be transferred to mobile communication terminal 100 via the wired I/O interface.

In a further aspect, removable module 120 can include various interface circuits for coupling various devices to system bus 4090, including first interface circuit 4088 coupled to laser source control circuit 4060, second interface circuit 4092 coupled to motor control circuit 4072, and third interface circuit 4094 coupled to electrical power input unit 4096.

As noted herein supra, in some embodiments removable module 120 can include other EIR devices, for example, an RFID reading device. In one illustrative embodiment, the RFID reading device can be compliant with *EPC™ Class*-1 *Generation*-2 *UHF RFID Protocol for Communications at* 860 *MHz*-960 *MHz* by EPCglobal, commonly known as the "Gen 2" standard, which defines physical and logical requirements for a passive-backscatter, Interrogator-talks-first (ITF) RFID system operating in the 860 MHz-960 MHz frequency range.

In some embodiments, removable module 120 can comprise an NFC reading device. In one illustrative embodiment, the NFC reading device of the EIR terminal can be compliant with *NFC Digital Protocol Technical Specification DIGITAL* 1.0 *NFCForum-TS-DigitalProtocol*-1.0 of 2010 Nov. 17 by NFC Forum™.

Figure 4C:
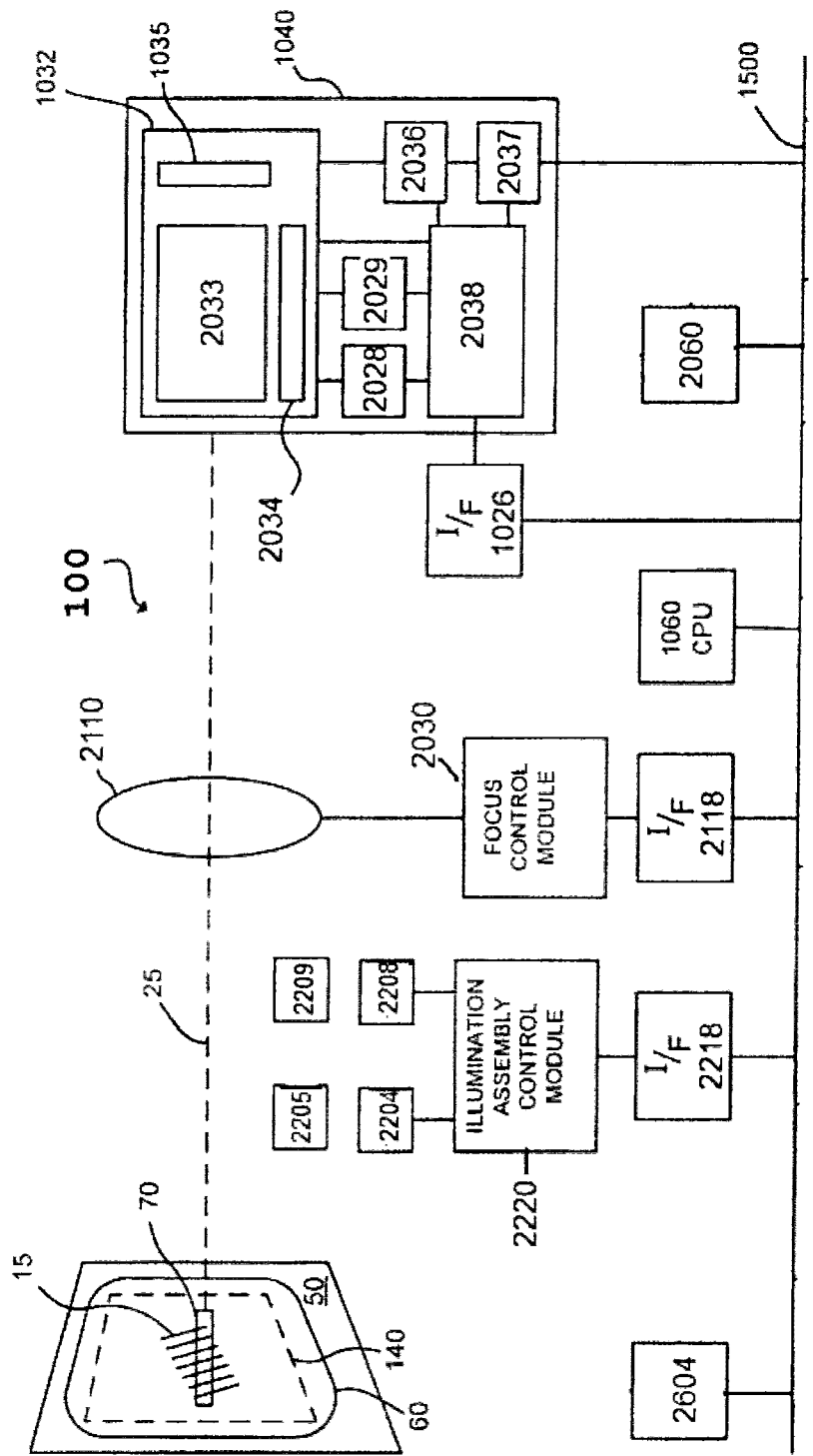

In another illustrative embodiment, schematically described in FIG. 4c, removable module 120 can comprise an imaging device 1040 configured to acquire two-dimensional monochrome and/or color images. Imaging device 2040 can comprise an image sensor 2032 including a multiple pixel image sensor 2033 array having pixels arranged in rows and columns, associated column circuitry 2034, and row circuitry 2035. In one embodiment, the image sensor 2033 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention. Associated with the image sensor 2032 can be amplifier circuitry 2036, and an analog to digital converter 2037 which converts image information in the form of analog signals read out of image sensor 2033 into image information in the form of digital signals. Image sensor 2032 can also have an associated timing and control circuit 2038 for use in controlling e.g., the exposure period of image sensor 2032, gain applied to the amplifier circuitry 2036. As noted herein supra, the circuit components 2032, 2036, 2037, and 2038 can be packaged into a common imaging device 2040.

Removable module 120 can include circuit 1026 for coupling image sensor timing and control circuit 2038 to system bus 2500. Removable module 120 can be configured to read out analog signals representative of light incident on one or more pixels. The read out analog signals can be amplified by the analog signal amplifier 2036. The analog signals can then be fed to the input of the ADC 2037. The resulting digital values representative of the analog signals can be combined to form image frame data comprising multibit pixel values, with each multibit pixel value representing light incident on a pixel of image sensor 2033. The image frame data can be transmitted to mobile communication terminal 100 via a wired I/O interface 1604 provided, e.g., by Ethernet (IEEE 802.3), USB, RS/485, etc. In some embodiments, the image frame data can be buffered in RAM 2080 before being transmitted to mobile communication terminal 100.

In another aspect, the removable module 120 can include a variable focus imaging lens 2110 for use in focusing an image of a decodable indicia located within a field of view 140 on a substrate 50 onto image sensor 2033. Imaging light rays can be transmitted about imaging axis 2025. Variable focus imaging lens 2110 can be adapted to be capable of multiple best focus distances and multiple focal lengths. Variable focus imaging lens 2110 can be operative to provide a new best focus distance and/or focal length within a fraction of a frame time in response to an applied input control signal being applied to the variable focus imaging lens 2110. In one embodiment, the variable focus imaging lens 2110 can be provided by a deformable imaging lens, e.g., a deformable fluid lens or gel lens. In another embodiment, the variable focus imaging lens 2110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

In some embodiments, removable module 120 can include a microprocessor 2060 communicatively coupled to system bus 2500. Microprocessor 2060 can be provided by a general purpose microprocessor or by a specialized microprocessor. Microprocessor 2060 can be programmed to decode optical decodable indicia, by processing digital signals outputted by the A/D converter converting analog signals representative of light incident on one or more pixels of the two-dimensional imaging device. The resulting decoded message data corresponding to the decodable indicia can be transferred to mobile communication terminal 100 via wired I/O interface 1604.

In some embodiments, removable module 120 can also include an illumination pattern light source bank 2204 for use in generating an illumination pattern 60 substantially corresponding to a field of view 140 of imaging device 2040 and an aiming pattern light source bank 2208 for use in generating an aiming pattern 70 on substrate 50. Shaping optics 2205 and 2209 can be provided for shaping light from bank 2204 and bank 2208 into pattern 60 and into pattern 70 respectively. In use, terminal 100 can be oriented by an operator with respect to a substrate 50 bearing decodable indicia 15 in such manner that aiming pattern 70 is projected on a decodable indicia 15.

Each of illumination pattern light source bank 2204 and aiming pattern light source bank 2208 can include one or more light sources provided, e.g., by light emitting diodes (LEDs). Variable focus imaging lens 2110 can be controlled with use of focus control module 2030 and the illumination assembly comprising illumination pattern light source bank 2204 and aiming pattern light source bank 2208 can be controlled with use of illumination assembly control module 2220. Focus control module 2030 can send signals to variable focus imaging lens 2110 e.g., for changing a best focus distance and/or a focal length of variable focus imaging lens 2110. Illumination assembly control module 2220 can send signals to illumination pattern light source bank 2204 e.g., for changing a level of illumination output by illumination pattern light source bank 2204.

In one example, the removable module 120 can be adapted so that illumination assembly control module 2220 controls light source bank 2204 to synchronize variable illumination level with certain lens settings. For example, illumination assembly control module 2220 controls light source bank 2204 to have a relatively lower level of illumination output when the best focus distance of imaging lens 2110 is set to a first shorter best focus distance, and a relatively higher level of illumination output when the best focus distance of imaging lens 2110 is set at a longer best focus distance.

As noted herein supra, removable module 120 can further comprise a memory configured to store a software security token (e.g., a secret string). An indicia decoding program executable by the microprocessor 1060 of mobile communication terminal 100 can be designed to retrieve and validate the secret string.

In one illustrative embodiment, mobile communication terminal 100 can be configured to validate the secret string before attempting a decoding operation. In another illustrative embodiment, mobile communication terminal 100 can be configured to validate the secret string upon performing a pre-defined number of decoding operations. In another illustrative embodiment, mobile communication terminal 100 can be configured to validate the secret string responsive to detecting a power-on event. In another illustrative embodiment, mobile communication terminal 100 can be configured to validate the secret string responsive to detecting a removable module connection event. In another illustrative embodiment, mobile communication terminal 100 can be configured to validate the secret string responsive to a pre-defined timeout expiration.

Mobile communication terminal 100 can employ various methods of validating the secret string. In one illustrative embodiment, mobile communication terminal 100 can validate the secret string by computing a hash value of the string using a pre-defined hashing function, and then comparing the computed hash value with a value stored in the non-volatile memory of mobile communication terminal 100. Validation is successful if the computed hash value is identical to the value stored in the memory.

In some embodiments, mobile communication terminal 100 can validate the secret string by using it as a decryption key to decrypt at least one data item stored in the memory of mobile communication terminal 100. In one illustrative embodiment, the decrypted data item can be compared to a value stored in the non-volatile memory of the mobile communication terminal. Validation is successful if the decrypted data item is identical to the value stored in the memory.

In some embodiments, mobile communication terminal 100 can validate the secret string by using it as a decryption key to decrypt at least one fragment of executable code stored in the memory of mobile communication terminal 100. In a further aspect, the decrypted code can be executed to decode an encoded message inputted by the EIR device 333.

Alternatively, mobile communication terminal 100 can validate the secret string by transmitting the string to an external computer over a wired or wireless communication interface. A "computer" herein shall refer to a programmable device for data processing, including a central processing unit (CPU), a memory, and at least one communication interface. The external computer can validate the secret string, e.g., by computing a hash value of the string using a pre-defined hashing function, and then comparing the computed hash value with a value stored in a non-volatile memory of the computer. Validation is successful if the computed hash value is identical to the value stored in the memory. The result can be transmitted back to the mobile communication terminal 100.

Figure 5:
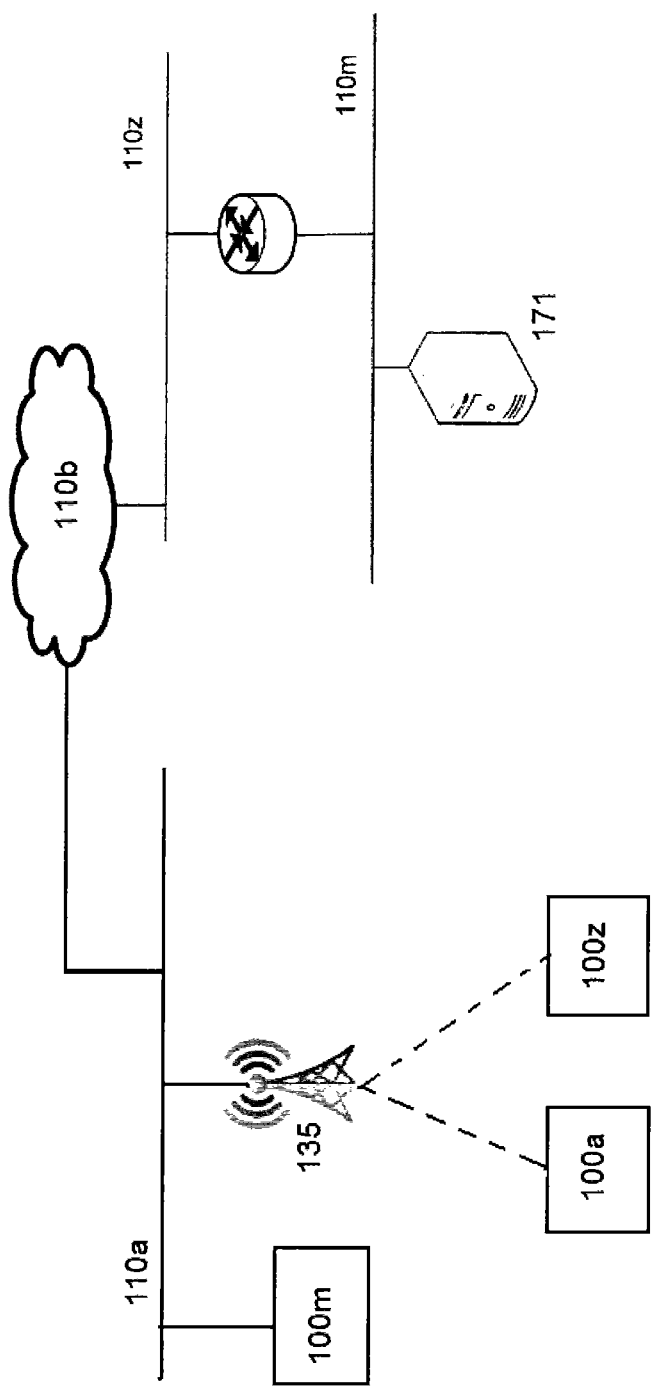
FIG. 5 schematically illustrates a network diagram of one illustrative embodiment of a data collection system employing the decodable indicia reading system disclosed herein.

In a further aspect, mobile communication terminal 100*a*-100*z* can access the external computer 171 over one or more local and/or wide area networks 110*a*-110*z*, as schematically illustrated in FIG. 5. Mobile communication terminal 100*a*-100*z* can connect to one or more networks 110*a*-110*z*, e.g., via a wireless access point 135. In one embodiment, at least one of networks 110*a*-110*z* can be provided by an IEEE 802.11x-compliant wireless network. In another embodiment, at least one of networks 110a-110z can be provided by an Ethernet network. In another embodiment, at least one of networks 110a-110z can be provided by a local area network (LAN). In another embodiment, at least one of networks 110a-110z can be provided by a wide area network (WAN). While different networks are designated herein, it is recognized that a single network as seen from the network layer of the OSI model can comprise a plurality of lower layer networks, i.e., what can be regarded as a single Internet Protocol (IP) network, can include a plurality of different physical networks.

A skilled artisan would appreciate the fact that other methods of validating the secret string received by mobile communication terminal 100 from removable module 120 are within the scope of this disclosure.

To provide enhanced security, removable module 120 can dynamically generate the secret string employed as the secure token. In one illustrative embodiment, the secret string can be dynamically generated by removable module 120 using a time-dependent function based on the time elapsed since a pre-defined moment in the past. In another illustrative embodiment, the secret string can be dynamically generated by removable module 120 using a time-dependent function based on the time elapsed since the last power-on event. In another illustrative embodiment, the secret string can be dynamically generated by removable module 120 using a function dependent on the number of decoding operations performed. A skilled artisan would appreciate the facts that other methods of dynamically generating the secret string by removable module 120 are within the scope of this disclosure.

In a further aspect, to validate the dynamically generated secret string, mobile communication terminal 100 or an external validation computer can evaluate the function identical to the one employed by removable module 120. The validation is successful if the two values are identical.

In another aspect, mobile communication terminal 100 can be in communication with an external computer 171 via a wired or wireless communication interface and one or more communication networks. In one embodiment, network frames can be exchanged by mobile communication terminal 100 and external computer 171 via one or more routers, base stations, and other infrastructure elements. In another embodiment, external computer 171 can be reachable by mobile communication terminal 100 via a local area network (LAN). In a yet another embodiment, external computer 171 can be reachable by mobile communication terminal 100 via a wide area network (WAN). A skilled artisan would appreciate the fact that other methods of providing interconnectivity between mobile communication terminal 100 and external computer 171 relying upon LANs, WANs, virtual private networks (VPNs), and/or other types of network are within the scope of this disclosure. In one embodiment, the communications between mobile communication terminal 100 and external computer 171 can comprise a series of requests and responses transmitted over one or more TCP connections, although a person skilled in the art would appreciate the fact that using other transport and application level protocols is within the scope of this disclosure. In some embodiments, at least one data frame transmitted by mobile communication terminal 100 to external computer 171 can comprise raw message data or decoded message data received by mobile communication terminal 100 from removable module 120.

There is provided a system comprising a mobile communication terminal and a removable module. The mobile communication terminal can be configured to execute one or more application programs. The removable module can be mechanically attached to the mobile communication terminal. The removable module can provide expanded general purpose and/or application-specific functionality, prevent unauthorized use of the application software executable by the mobile communication terminal, and/or store user profile settings for one or more applications executable by the mobile communication terminal. In some embodiments, the removable module can further comprise a memory configured to store a secret string. At least one application program executable by the mobile communication terminal can be configured to perform its intended functionality only responsive to validating a secret string and/or decrypting, using the secret string, at least one data item stored in the memory.

A small sample of systems, methods, and apparata that are described herein is as follows:

A1. A system comprising: a mobile communication terminal including a first housing, a microprocessor disposed within said first housing, and a first memory disposed within said first housing; a removable module comprising a second housing; at least one application program executable by said microprocessor, said at least one application program configured to perform at least one useful business function; wherein said removable module is mechanically attached to said mobile communication terminal; wherein said removable module further comprises a second memory configured to store a secret string; and wherein said at least one application program is further configured to perform said at least one useful business function responsive to at least one of: validating said secret string and decrypting, using said secret string, at least one data item stored in said first memory. A2. The system of (A1), wherein said removable module is further configured to store in said second memory one or more user profile settings for at least one user of said mobile communication terminal. A3. The system of (A1), wherein said mobile communication terminal further comprise at least one wired communication interface including an electromechanical connector mechanically attached to said first housing; and wherein said removable module is communicatively coupled to said mobile communication terminal via said electromechanical connector. A4. The system of (A3), wherein said electromechanical connector is provided by one of: a USB connector, a PCMCIA connector, an Ethernet connector. A5. The system of (A1), wherein said validating said secret string is performed by an external computer. A6. The system of (A1), wherein said secret string is dynamically generated by said removable module. A7. The system of (A1), wherein said mobile communication terminal further comprises a wireless communication interface communicatively coupled to said microprocessor, said wireless communication interface at least partially disposed within said first housing. A8. The system of (A1), wherein said mobile communication terminal is provided by one of: a smart phone, a tablet personal computer (PC), and a personal digital assistant (PDA).

B1. A decodable indicia reading system comprising: a mobile communication terminal including a first housing, a microprocessor disposed within said first housing, a first memory disposed within said first housing, an imaging device comprising a two-dimensional image sensor, said imaging device disposed within said first housing; a removable module comprising a second housing at least partially containing at least one of: an encoded information reading (EIR) device, an illumination module, and an optical system configured to focus onto said two-dimensional image sensor light reflected by a physical object located within a field of view of said two-dimensional image sensor; a decoding program executable by said microprocessor, said decoding program is configured to input an encoded information item via one of: said imaging device and said EIR device; wherein said removable module is mechanically attached to said mobile communication terminal; wherein said removable module further comprises a second memory configured to store a secret string; and wherein said decoding program is further configured to output a decoded message by decoding said encoded information item responsive to at least one of: validating said secret string and decrypting, using said secret string, at least one data item stored in said first memory. B2. The decodable indicia reading system of (B1), wherein said mobile communication terminal further comprise at least one wired communication interface including an electromechanical connector mechanically attached to said first housing; and wherein said removable module is communicatively coupled to said mobile communication terminal via said electromechanical connector. B3. The decodable indicia reading system of (B2), wherein said electromechanical connector is provided by one of: a USB connector, a PCMCIA connector, an Ethernet connector. B4. The decodable indicia reading system of (B1), wherein said EIR device is provided by one of: an RFID reading device, a card reading device, and a laser scanning device. B5. The decodable indicia reading system of (B4), wherein said laser scanning device comprises a laser source, a photo-detector configured to generate an analog signal representative of a received light beam of variable intensity, and an analog-to-digital (A/D) converter configured to convert said analog signal into a digital signal. B6. The decodable indicia reading system of (B1), wherein said validating said secret string is performed by an external computer. B7. The decodable indicia reading system of (B1), wherein said secret string is dynamically generated by said removable module. B8. The decodable indicia reading system of (B1), wherein said mobile communication terminal further comprises a wireless communication interface communicatively coupled to said microprocessor, said wireless communication interface at least partially disposed within said first housing. B9. The decodable indicia reading system of (B1), wherein said mobile communication terminal is provided by one of: a smart phone, a tablet personal computer (PC), and a personal digital assistant (PDA). B10. The decodable indicia reading system of (B1), wherein said imaging device further comprises at least one of: an amplifier configured to amplify an analog signal outputted by said two-dimensional image sensor, said analog signal representative of light reflected by said physical object; an analog-to-digital (A/D) converter configured to convert said analog signal into a digital signal representative of said light reflected by said physical object; and a control circuit configured to control said imaging device. B11. The decodable indicia reading system of (B1), wherein said illumination module comprises at least one of: an illumination pattern light source bank including one or more light sources, an aiming pattern light source bank including one or more light sources, and an illumination assembly control module. B12. The decodable indicia reading system of (B1), wherein said optical system comprises at least one mirror configured to deflect said light reflected by said physical object located within a field of view of said two-dimensional image sensor.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

The invention claimed is:
1. A system, comprising:
a mobile communication terminal comprising a first housing, a first processor disposed within the first housing, and a first memory disposed within said first housing;
a removable module comprising a second housing, a second processor disposed within the second housing, and a second memory configured to store a software security token, wherein the removable module is mechanically attached to the mobile communication terminal; and
a decoding program executable by the first processor and/or the second processor, the decoding program configured to:
receive an encoded information item;
attempt to validate the software security token and decrypt at least one data item using the software security token; and
responsive to validating the software security token and decrypting the at least one data item, decode the encoded information item and output a decoded message.
2. The system of claim 1, wherein the removable module is configured to store in the second memory one or more user profile settings for at least one user of the mobile communication terminal.
3. The system of claim 1, wherein:
the mobile communication terminal comprises at least one wired communication interface comprising an electromechanical connector mechanically attached to the first housing; and
the removable module is communicatively coupled to the mobile communication terminal via the electromechanical connector.
4. The system of claim 1, wherein attempting to validate the software security token comprises attempting to validate the software security token with an external computer.
5. The system of claim 1, wherein the software security token is dynamically generated by the removable module.
6. The system of claim 1, wherein the mobile communication terminal comprises a wireless communication interface communicatively coupled to the first processor, the wireless communication interface at least partially disposed within the first housing.
7. The system of claim 1, wherein the mobile communication terminal is a smart phone, a tablet personal computer (PC), and/or a personal digital assistant (PDA).
8. A system, comprising:
a mobile communication terminal comprising a first housing, a processor disposed within the first housing, a first memory disposed within the first housing, an imaging device comprising a two-dimensional image sensor, the imaging device disposed within the first housing;
a removable module comprising a second housing, a second processor disposed within the second housing, and a second memory disposed within the second housing and configured to store a software security token, the second housing at least partially containing at least one of: an illumination module and an optical system configured to focus onto the two-dimensional image sensor light reflected by a physical object located within a field of view of the two-dimensional image sensor, wherein the removable module is mechanically attached to the mobile communication terminal;

a decoding program executable by the first processor and/or the second processor, the decoding program configured to:
  receive an encoded information item via the imaging device;
  attempt to validate the software security token and decrypt at least one data item using the software security token; and
  responsive to validating the software security token and decrypting the at least one data item, decode the encoded information item and output a decoded message.

9. The system of claim 8, wherein:
the mobile communication terminal comprises at least one wired communication interface comprising an electromechanical connector mechanically attached to the first housing; and
the removable module is communicatively coupled to the mobile communication terminal via the electromechanical connector.

10. The system of claim 8, wherein attempting to validate the software security token comprises attempting to validate the software security token with an external computer.

11. The system of claim 8, wherein the software security token is dynamically generated by the removable module.

12. The system of claim 8, wherein the mobile communication terminal comprises a wireless communication interface communicatively coupled to the first processor, the wireless communication interface at least partially disposed within the first housing.

13. The system of claim 8, wherein the mobile communication terminal is a smart phone, a tablet personal computer (PC), and/or a personal digital assistant (PDA).

14. The system of claim 8, wherein the imaging device comprises at least one of:
  an amplifier configured to amplify an analog signal output by the two-dimensional image sensor, the analog signal representative of light reflected by the physical object;
  an analog-to-digital (AID) converter configured to convert the analog signal into a digital signal representative of the light reflected by the physical object; and
  a control circuit configured to control the imaging device.

15. The system of claim 8, wherein the illumination module comprises at least one of: an illumination pattern light source bank including one or more light sources, an aiming pattern light source bank including one or more light sources, and an illumination assembly control module.

16. The system of claim 8, wherein the optical system comprises at least one mirror configured to deflect the light reflected by the physical object located within a field of view of the two-dimensional image sensor.

17. A system, comprising:
a mobile communication terminal comprising a first housing, a first processor disposed within the first housing, and a first memory disposed within said first housing;
a removable module comprising a second housing, a second processor disposed within the second housing, and a second memory configured to store a software security token, wherein the removable module is mechanically attached to the mobile communication terminal; and
a decoding program executable by the second processor, the decoding program configured to:
  receive an encoded information item;
  attempt to validate the software security token and decrypt at least one data item using the software security token; and
  responsive to validating the software security token and decrypting the at least one data item, decode the encoded information item and output a decoded message.

18. The system of claim 17, wherein the removable module is configured to store in the second memory one or more user profile settings for at least one user of the mobile communication terminal.

19. The system of claim 17, wherein attempting to validate the software security token comprises attempting to validate the software security token with an external computer.

20. The system of claim 17, wherein the software security token is dynamically generated by the removable module.

* * * * *